(12) United States Patent
Jiang et al.

(10) Patent No.: US 11,340,065 B2
(45) Date of Patent: May 24, 2022

(54) OPTICAL FIBER INCLINATION MEASUREMENT APPARATUS AND DIFFERENTIAL INCLINATION MEASUREMENT SYSTEM

(71) Applicant: Qilu University of Technology(Shandong Academy of Sciences), Jinan (CN)

(72) Inventors: Shaodong Jiang, Ji'nan (CN); Chang Wang, Ji'nan (CN); Qingchao Zhao, Ji'nan (CN); Yingying Wang, Ji'nan (CN); Faxiang Zhang, Ji'nan (CN); Jiasheng Ni, Ji'nan (CN); Xiaohui Liu, Ji'nan (CN); Xiaolei Zhang, Ji'nan (CN); Hui Li, Ji'nan (CN); Long Ma, Ji'nan (CN)

(73) Assignee: Qilu University of Technology(Shandong Academy of Sciences), Jinan (CN)

( * ) Notice: Subject to any disclaimer, the term of this patent is extended or adjusted under 35 U.S.C. 154(b) by 462 days.

(21) Appl. No.: 16/508,999

(22) Filed: Jul. 11, 2019

(65) Prior Publication Data
US 2020/0141728 A1 May 7, 2020

(30) Foreign Application Priority Data
Nov. 5, 2018 (CN) .......................... 201811311732.7

(51) Int. Cl.
*G01C 9/06* (2006.01)
*G01C 9/14* (2006.01)

(52) U.S. Cl.
CPC ................ *G01C 9/06* (2013.01); *G01C 9/14* (2013.01); *G01C 2009/066* (2013.01)

(58) Field of Classification Search
CPC ... G01C 9/06; G01C 9/14; G01C 9/12; G01C 2009/066
See application file for complete search history.

(56) References Cited

U.S. PATENT DOCUMENTS 4,219,940 A * 9/1980 Okubo ................... G01C 21/18
33/366.24
5,841,529 A * 11/1998 Sirkis ................. G01D 5/35383
356/481

(Continued)

*Primary Examiner* — Sang H Nguyen
(74) *Attorney, Agent, or Firm* — Reising Ethington, P.C.

(57) ABSTRACT

An optical fiber inclination measurement apparatus and a differential inclination measurement system are provided, which is related to the field of monitoring technology. The apparatus includes a supporting mechanism with a base and a base frame, a swinging mechanism with a pendulum, a cycloid, and a first reflective film is disposed on the pendulum. The measurement mechanism includes a first optical fiber, and an end surface of the first optical fiber is disposed opposite to the first reflective film. During an earthquake generating process, a landform changes and the pendulum swings, resulting in changes in displacement. The end surface of the first optical fiber together with the first reflective film form a Fabry-Perot cavity. The cavity length of the Fabry-Perot cavity changes before and after the landform deforms, and an angle of inclination is equal to a value obtained by dividing the cavity length variation of the Fabry-Perot cavity by the pendulum length.

5 Claims, 7 Drawing Sheets

(56) References Cited

U.S. PATENT DOCUMENTS

| | | | | |
|---|---|---|---|---|
| 8,299,636 | B2* | 10/2012 | Cornish | H02K 53/00 |
| | | | | 290/1 R |
| 9,250,118 | B2* | 2/2016 | Zumberge | G01H 9/00 |
| 9,528,900 | B2* | 12/2016 | Gregory | G01M 1/36 |
| 9,627,952 | B2* | 4/2017 | Schroeder | H02K 53/00 |
| 2010/0148517 | A1* | 6/2010 | Duclos | F03G 3/06 |
| | | | | 290/1 C |
| 2010/0237631 | A1* | 9/2010 | Yu | F03G 7/10 |
| | | | | 290/1 R |
| 2014/0041241 | A1* | 2/2014 | Jaze | G01C 9/12 |
| | | | | 33/301 |

* cited by examiner

OPTICAL FIBER INCLINATION MEASUREMENT APPARATUS AND DIFFERENTIAL INCLINATION MEASUREMENT SYSTEM

CROSS-REFERENCE TO RELATED APPLICATIONS

The present application claims priority under 35 U.S.C 119(a) to Chinese Application No. 201811311732.7, filed on Nov. 5, 2018, which is incorporated herein by reference in its entirety.

TECHNICAL FIELD

The present disclosure relates to the field of monitoring technology, and in particular, to an optical fiber inclination measurement apparatus and a differential inclination measurement system.

BACKGROUND

Land deformation is the most direct accompanying phenomenon during an earthquake, and deformation features thereof can provide direct evidences of a crustal movement. Land deformation observing is an important measure for monitoring a crustal movement and deformation, for recognizing an earthquake generating process, and for predicting an earthquake. The land deformation observing is high in precision and good in continuity, and has relatively definite physical significance and predictive value in terms of mid-term, short-term, and impending predictions of the earthquake.

At present, clinometers for observing the land deformation mainly are electrical sensors that use the capacitive-sensing principle. Compared with conventional clinometers, optical fiber clinometers have advantages of anti-electromagnetic interference, resisting lightning strikes, being simple in structure, and being reliable, and are particularly suitable for long-term online observation of the land deformation in a field environment. In recent years, researchers have gradually paid attention to optical fiber clinometers, and have made some achievements. However, these optical fiber clinometers all use the fiber grating sensing principle, where a fiber grating is directly bonded with a sensitive structure, resulting in that the clinometers have a weak impact-resisting capability. Creepage occurs at a bonding position of the fiber grating for a long term, affecting the measurement precision. Thus, the clinometers have the problem of low sensitivity.

SUMMARY

One objective of the present application is to provide an optical fiber inclination measurement apparatus, aimed at addressing a problem that an optical fiber clinometer has a weak impact-resisting capability and a low sensitivity.

Another objective is to provide a differential inclination measurement system, aimed at improving the inclination measurement precision and alleviating the impact of the temperature by using a differential structure.

For the one objective, the following technical solutions are provided in the present application.

An optical fiber inclination measurement apparatus is provided, including a supporting mechanism, a swinging mechanism, and a first measurement mechanism.

The supporting mechanism includes a base and a base frame fixed onto the base.

The swinging mechanism includes a pendulum and a cycloid, where two ends of the cycloid are connected to the base frame and the pendulum, respectively, and a first reflective film is disposed on a side surface of the pendulum.

The measurement mechanism includes a first optical fiber, and an end surface of the first optical fiber is disposed opposite to the first reflective film.

Further, in an embodiment of the present application, the optical fiber inclination measurement apparatus further includes a first fine adjustment mechanism, where the first fine adjustment mechanism includes a first adjustment frame and a first holding member for holding the first optical fiber, the first adjustment frame is disposed on the base, the first holding member is fixed to the first adjustment frame, and the first adjustment frame can adjust an initial position of the first optical fiber.

Further, in an embodiment of the present application, the first holding member is provided with a dovetail groove, the first adjustment frame is provided with a dovetail base that engages with the dovetail groove, and the dovetail base engages with the dovetail groove to enable the first holding member to be fixed to the first adjustment frame.

Further, in an embodiment of the present application, a side of the first optical fiber that is away from the first reflective film is provided with a first demodulator, and the first demodulator is configured to transmit an optical signal to the first optical fiber and receive the optical signal reflected by the first reflective film and the end surface of the first optical fiber to obtain a cavity length variation of a Fabry-Perot cavity.

Further, in an embodiment of the present application, an axis of the first optical fiber is perpendicular to a plane on which the first reflective film is located.

For the another objective, the following technical solutions are provided in the present invention.

An embodiment of the present application further provides a differential inclination measurement system, including the optical fiber inclination measurement apparatus described as above and a second measurement mechanism.

Two cycloids with a same length are provided.

The second measurement mechanism includes a second optical fiber, where the second optical fiber is disposed opposite to the first optical fiber, the pendulum is further provided with a second reflective film, which is disposed opposite to the first reflective film, and the pendulum is disposed between the first optical fiber and the second optical fiber.

Further, in an embodiment of the present application, the differential inclination measurement system further includes a second fine adjustment mechanism, where the second fine adjustment mechanism includes a second adjustment frame and a second holding member for holding the second optical fiber, where the second adjustment frame is disposed on the base, the second holding member is fixed to the second adjustment frame, and the second adjustment frame can adjust an initial position of the second optical fiber.

Further, in an embodiment of the present application, the second holding member is provided with a dovetail groove, the second adjustment frame is provided with a dovetail base, and the dovetail base can be inserted into the dovetail groove to enable the second holding member to be fixed to the second adjustment frame.

Further, in an embodiment of the present application, a side of the second optical fiber that is away from the second reflective film is provided with a second demodulator, and the second demodulator is configured to transmit an optical signal and receive the optical signal reflected by the second reflective film and an end surface of the second optical fiber to obtain a cavity length variation of a Fabry-Perot cavity.

Further, in an embodiment of the present application, a distance from an end of the first optical fiber that is adjacent to the first reflective film to the first reflective film is equal to a distance from an end of the second optical fiber that is adjacent to the second reflective film to the second reflective film.

The present application has an advantage effect as follows. The optical fiber inclination measurement apparatus includes a supporting mechanism, a swinging mechanism, and a first measurement mechanism. The pendulum is subject to the cycloid, and during an earthquake generating process, a landform changes and the pendulum swings under an action of gravity, resulting in a change in the displacement. The end surface of the first optical fiber together with the first reflective film form a Fabry-Perot cavity. The cavity length of the Fabry-Perot cavity changes before and after the landform deforms, and a difference between the changes equals to a displacement of the pendulum. According to a motion principle of swinging, a variation of an angle of inclination is equal to a value obtained by dividing the displacement of the pendulum by a pendulum length, that is, by dividing the cavity length variation of the Fabry-Perot cavity by the pendulum length, so as to be able to perform inclination measurement monitoring. Compared with conventional optical fiber clinometers, the optical fiber inclination measurement apparatus has a better impact-resisting capability and a high sensitivity.

BRIEF DESCRIPTION OF THE DRAWINGS

To more clearly describe the technical solutions of the implementations of the present application, the accompanying drawings to be used in the implementations are briefly illustrated below. It should be understood that the following accompanying drawings merely show some embodiments of the present application, and therefore should not be construed as limiting the scope. Persons of ordinary skills in the art can also derive other related accompanying drawings according to these accompanying drawings herein without an effective effort.

Reference numerals: 10-optical fiber inclination measurement apparatus; 100-supporting mechanism; 110-base; 111-adjustment screw rods; 130-base frame; 300-swinging mechanism; 310-pendulum; 311-first reflective film; 313-second reflective film; 330-cycloid; 500-first measurement mechanism; 510-first optical fiber; 700-first fine adjustment mechanism; 710-first adjustment frame; 730-first holding member; 20-differential inclination measurement system; 200-second measurement mechanism; 210-second optical fiber; 400-second fine adjustment mechanism; 410-second adjustment frame; 430-second holding member.

DETAILED DESCRIPTION

To make the objectives, technical solutions, and advantages of the implementations of the present application more clear, the technical solutions in the implementations of the present application are clearly and thoroughly described below in combination with the accompanying drawings in the implementations of the present application. Apparently, the described implementations are merely some implementations of the present application and are not all implementations. According to the implementations, all other implementations derived by persons of ordinary skills in the art without an effective effort fall into the protection scope of the present invention.

Therefore, the following detailed descriptions about the implementations of the present application that are provided in the accompanying drawings are not intended to limit the claimed scope of the present invention, but merely indicating the selected implementations of the present application. According to the implementations in the present application, all other implementations derived by persons of ordinary skills in the art without an effective effort fall into the protection scope of the present application.

It should be noted that similar numerals and characters indicate similar items in the following accompanying drawings. Therefore, once an item is defined in an accompanying drawing, further definition and explanation of the item are omitted in the subsequent accompanying drawings.

In the description of the present application, it should be understood that the orientation or position relationships indicated by the terms such as "center", "longitudinal", "transverse", "length", "width", "thickness", "above", "under", "front", "back", "left", "right", "vertical", "horizontal", "top", "bottom", "inside", "outside", "clockwise", and "anticlockwise" are based on the orientation or position relationships as shown in the accompanying drawings, and are merely for ease of describing the present application and for brevity of the description, rather than indicating or implying that the mentioned apparatus or component needs to have a particular orientation or needs to be constructed and operated in a particular orientation. Therefore, such terms should not be construed as limiting the present invention.

In addition, the terms such as "first" and "second" are used only for the purpose of description, and should not be understood as indicating or implying the importance of relativity or as implicitly specifying the number of the indicated technical features. Hence, features defined by "first" and "second" may explicitly or implicitly include one or more of said features. In the description of the present application, unless otherwise explicitly and specifically defined, "a plurality of" means two or more than two.

In the present application, unless otherwise explicitly specified and defined, the terms such as "mount to", "link to", "connect to", and "fix to" should be understood in a broad sense. For example, it may be a fixed connection, a detachable connection, or an integral connection; it may be a direct connection, or an indirect connection through an intermediary; it may be an internal communication between two elements, or an interaction relationship between two elements. Persons of ordinary skills in the art may understand the specific meanings of the foregoing terms in the present application according to specific situations.

Embodiments

Figure 1:
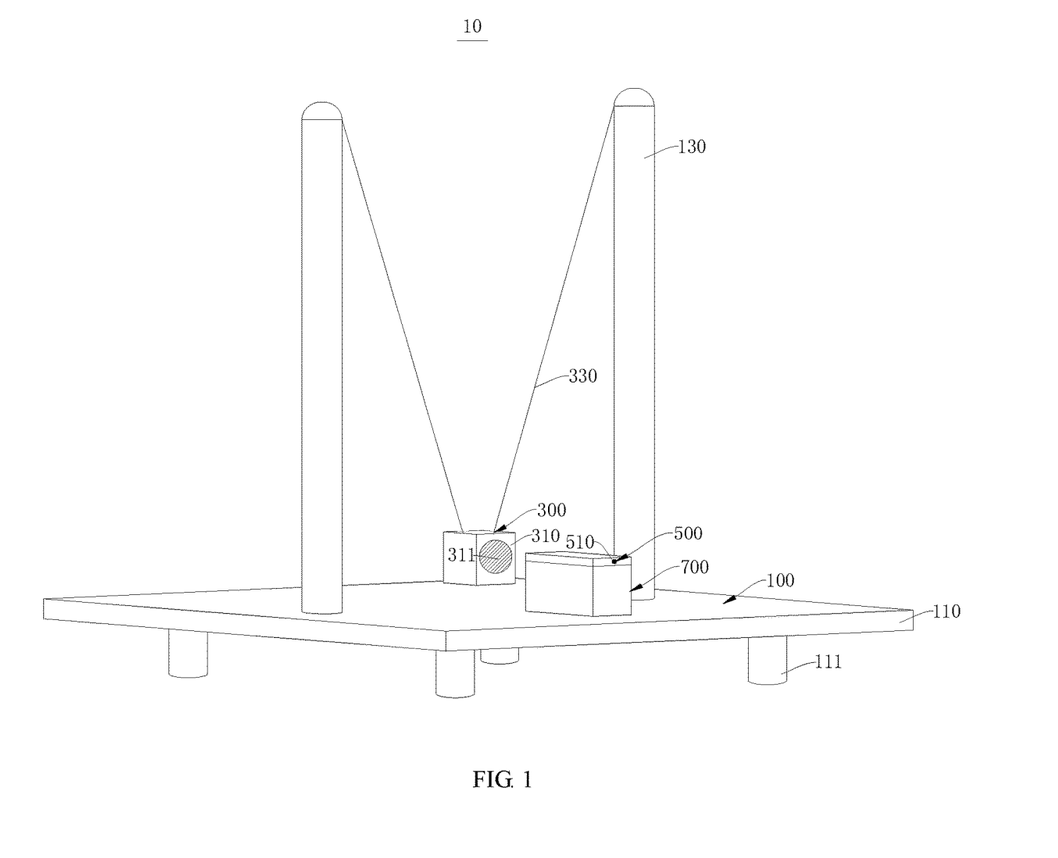
FIG. 1 is a schematic structural diagram of a optical fiber inclination measurement apparatus according to a first embodiment of the present application.

Referring to FIG. 1, an optical fiber inclination measurement apparatus 10 includes a supporting mechanism 100, a swinging mechanism 300, and a first measurement mechanism 500.

The supporting mechanism 100 includes a base 110 and a base frame 130 fixed onto the base 110.

The swinging mechanism 300 includes a pendulum 310 and a cycloid 330. Two ends of the cycloid 330 are connected to the base frame 130 and the pendulum 310, respectively. A first reflective film 311 is disposed on a side surface of the pendulum 310.

The measurement mechanism 500 includes a first optical fiber 510, and an end surface of the first optical fiber 510 is disposed opposite to the first reflective film 311.

In this embodiment, the pendulum 310 is subject to the length of the cycloid 330. During an earthquake generating process, a landform changes and the pendulum 310 swings under an action of gravity, resulting in a change in the displacement. The end surface of the first optical fiber 510 together with the first reflective film 311 form a Fabry-Perot cavity. The cavity length of the Fabry-Perot cavity changes before and after the landform deforms, and a difference between the changes equals to the displacement of the pendulum 310. According to a motion principle of swinging, a variation of an angle of inclination is equal to a value obtained by dividing the displacement of the pendulum 310 by a pendulum length, that is, by dividing the cavity length variation of the Fabry-Perot cavity by the pendulum length, so as to be able to perform inclination measurement monitoring. Compared with conventional optical fiber clinometers, the optical fiber inclination measurement apparatus has a better impact-resisting capability and a high sensitivity.

When calculating the angle of inclination, although the pendulum 310 performs a circular movement, since a movement distance thereof is small, it can be assumed that the pendulum 310 moves in a horizontal manner. Therefore, the change of the cavity length of the Fabry-Perot cavity can be considered as the displacement of the pendulum 310.

Specifically, in this embodiment, the base 110 is a horizontally disposed plate-shape structure, such as an iron plate. To ensure that the base 110 is being horizontal, adjustment screw rods 111 are mounted at a bottom of the base 110 for horizontal alignment. Further, for ease of horizontal adjusting, a level bubble (not shown in the figures) is mounted on a surface of the base 110. When leveling the base 110, it can be quickly leveled according to a bubble condition of the level bubble.

In this embodiment, two cycloids 330 with a same length are provided. One end of the cycloid 330 is fixed to the base frame 130, and the other end of the cycloid 330 is used to fix to the pendulum 310, so that the pendulum 310 can move by being subject to the two cycloids 330.

Figure 2:
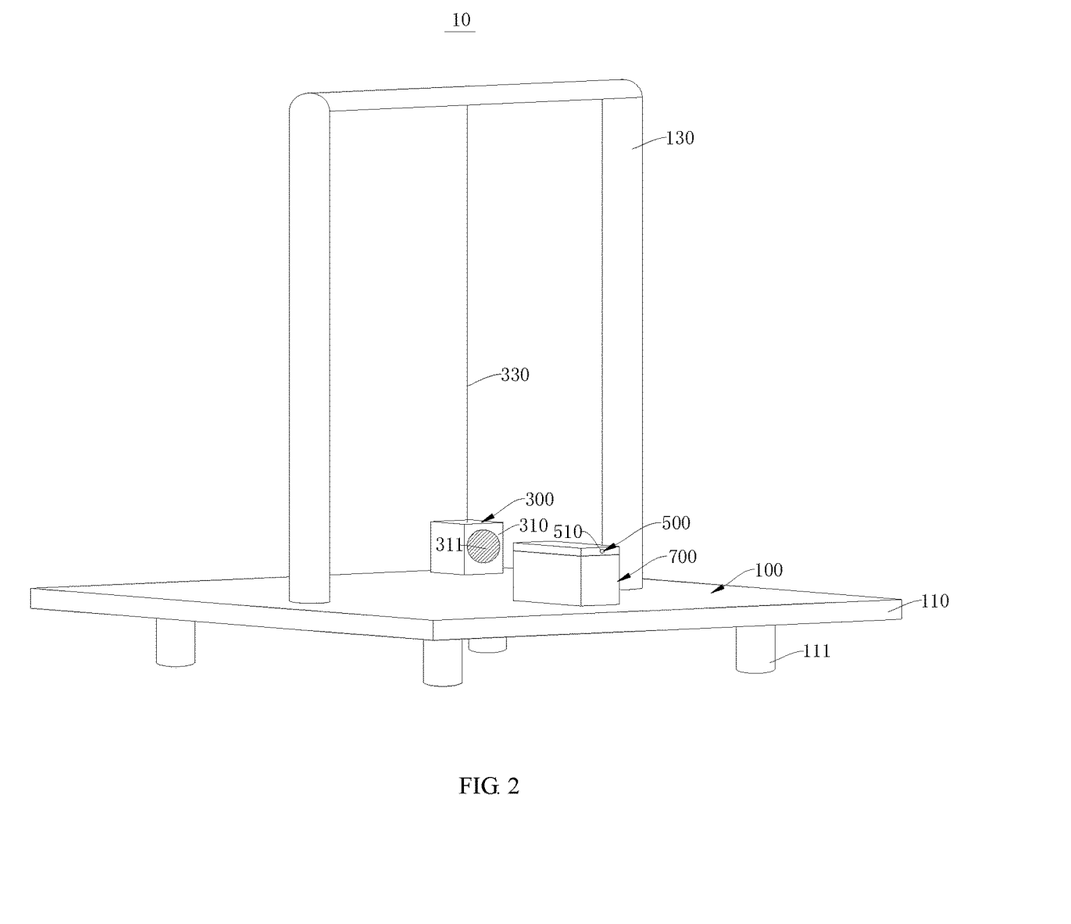
FIG. 2 is a schematic structural diagram of a optical fiber inclination measurement apparatus according to a second embodiment of the present application.
Figure 3:
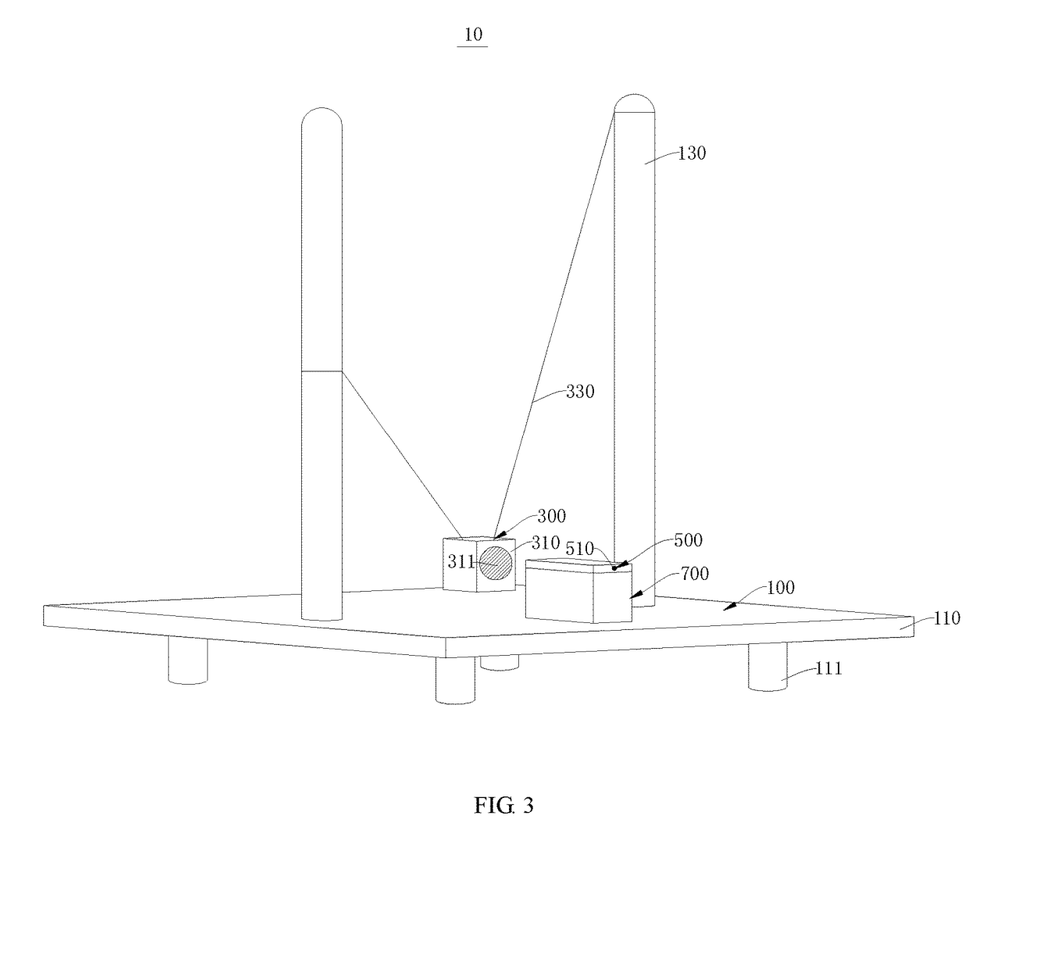
FIG. 3 is a schematic structural diagram of a optical fiber inclination measurement apparatus according to a third embodiment of the present application.
Figure 4:
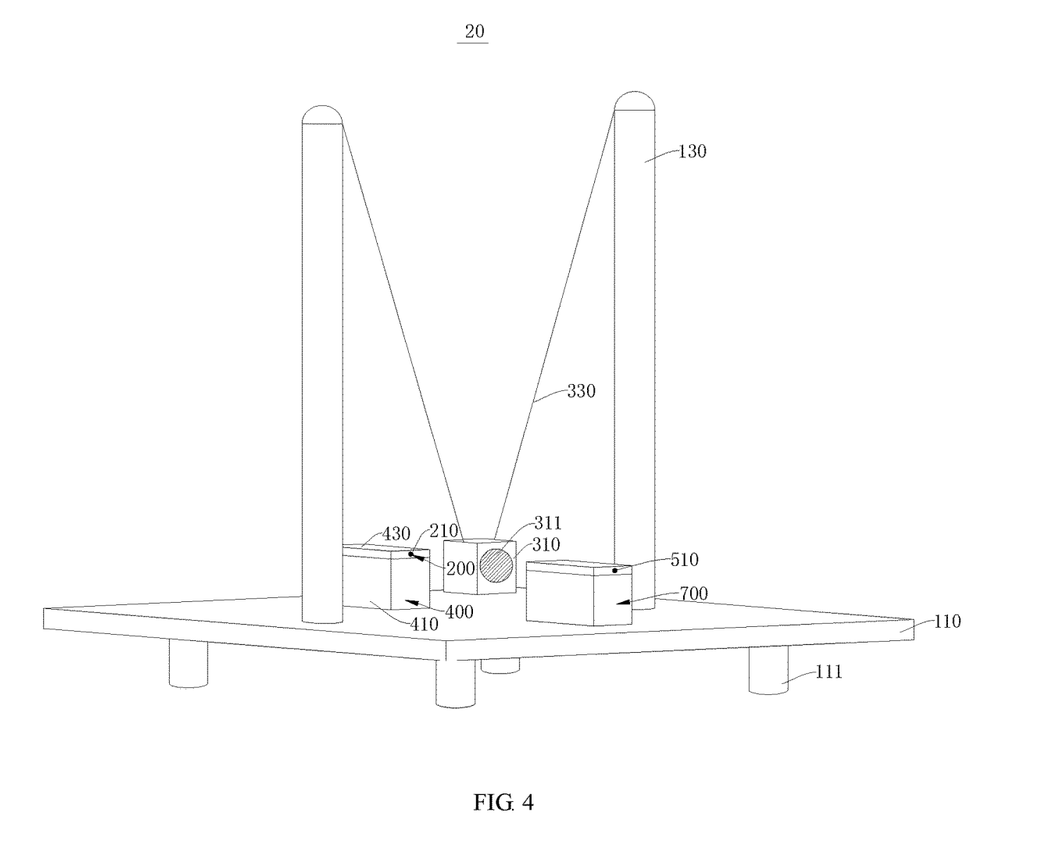
FIG. 4 is a schematic structural diagram in a first angle of view of a differential inclination measurement system according to an embodiment of the present application.
Figure 5:
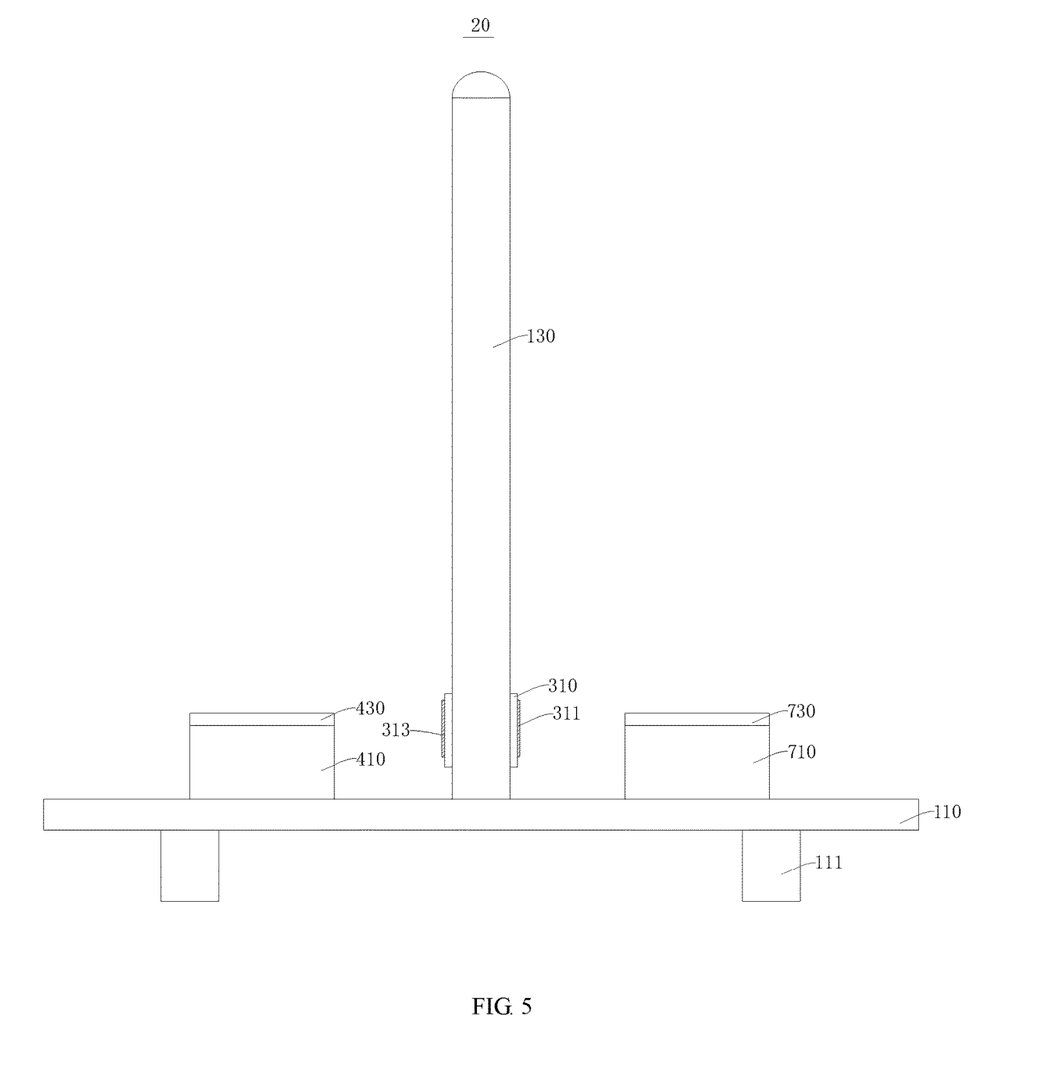
FIG. 5 is a schematic structural diagram in a second angle of view of a differential inclination measurement system according to an embodiment of the present application.
Figure 6:
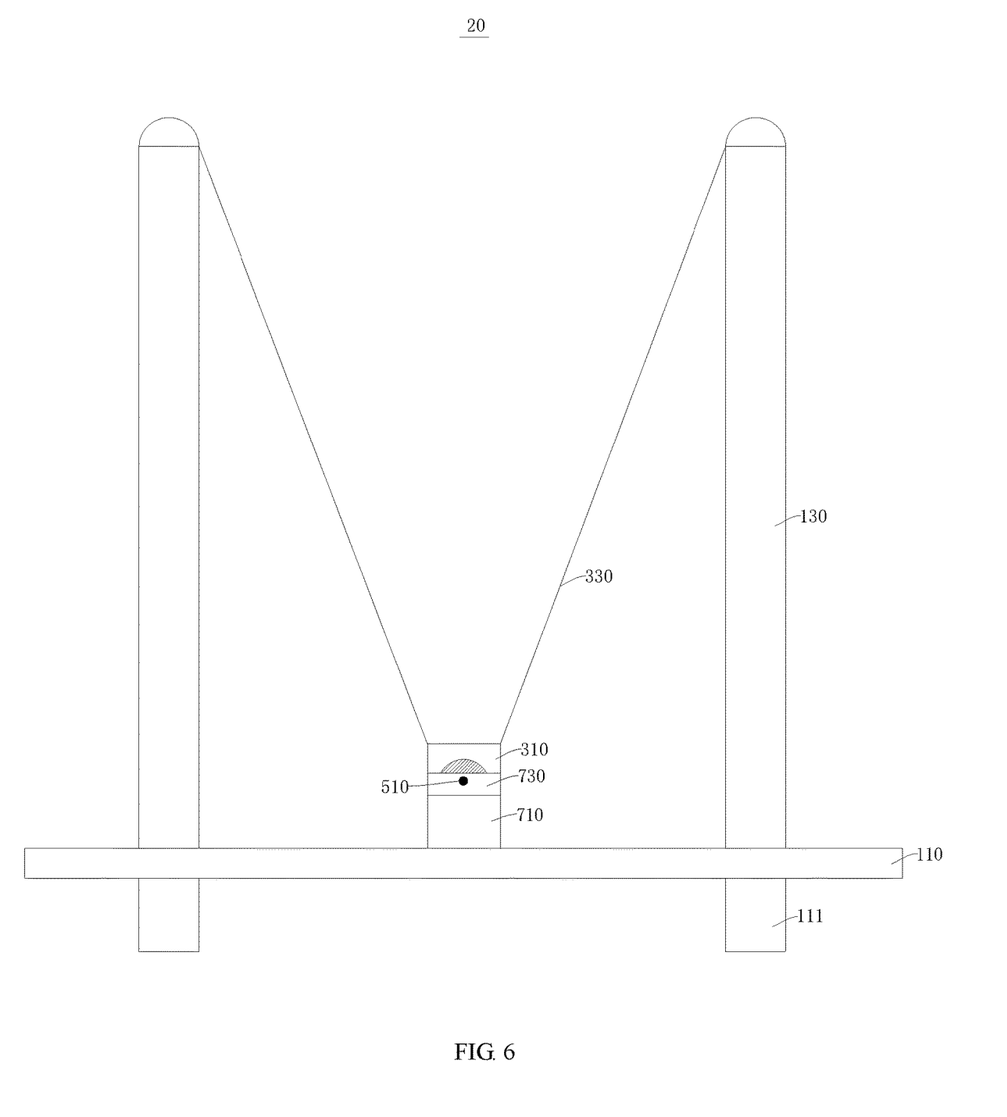
FIG. 6 is a schematic structural diagram in a third angle of view of a differential inclination measurement system according to an embodiment of the present application.
Figure 7:
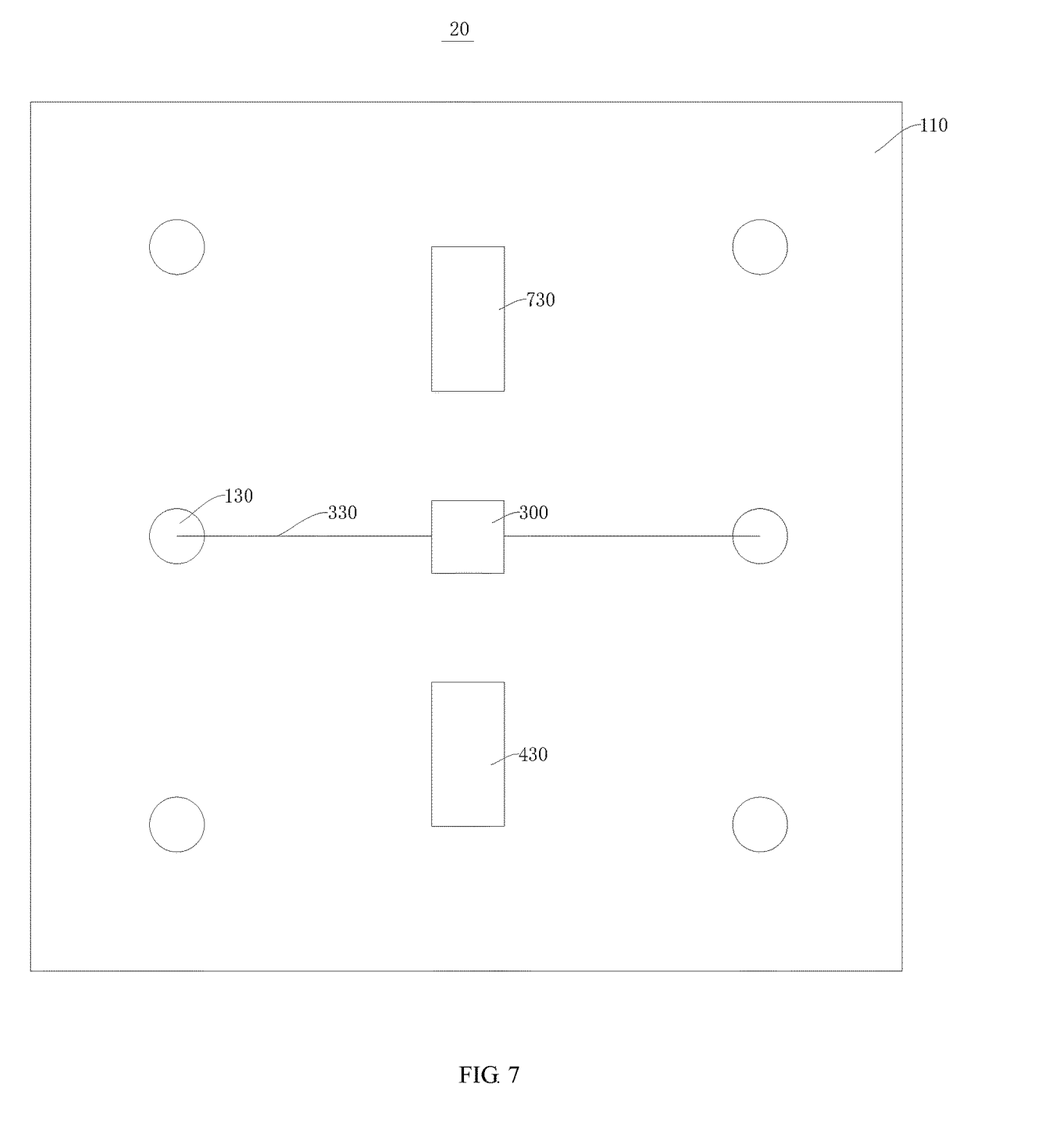
FIG. 7 is a schematic structural diagram in a fourth angle of view of a differential inclination measurement system according to an embodiment of the present application.

It may be understood that in other embodiments, the two cycloids 330 may have different lengths, or there may be only one cycloid 330, referring to FIG. 2 and FIG. 3. Therefore, this is not specifically limited in the present invention.

Specifically, in this embodiment, the pendulum 310 is a regular hexahedron, and the first reflective film 311 is disposed on one side surface thereof.

To control an initial cavity length of the Fabry-Perot cavity to be within a reasonable range, an initial position of the first optical fiber 510 needs to be adjusted. Specifically, in this embodiment, the optical fiber inclination measurement apparatus 10 further includes a first fine adjustment mechanism 700. The first fine adjustment mechanism 700 includes a first adjustment frame 710 and a first holding member 730 for holding the first optical fiber 510. The first adjustment frame 710 is disposed on the base 110. The first holding member 730 is fixed to the first adjustment frame 710. The initial position of the first optical fiber 510 can be adjusted by the first adjustment frame 710. Specifically, the first holding member 730 is provided with a mounting hole for allowing the first optical fiber 510 to pass through.

The first holding member 730 is provided with a dovetail groove. The first adjustment frame 710 is provided with a dovetail base that engages with the dovetail groove. The dovetail base engages with the dovetail groove to enable the first holding member 730 to be fixed to the first adjustment frame 710.

It should be noted that in other embodiments, the first adjustment frame 710 and the first holding member 730 may also be connected in other manners, such as being connected by using a bolt, a screw, or a pin. A person skilled in the art can make a selection according to actual requirements, and this is not specifically limited in the present invention.

In this embodiment, the first holding member 730 is fixed to the first adjustment frame 710. The first adjustment frame 710 adjusts the position of the first holding member 730 so as to change the initial position of the first optical fiber 510, so that the initial cavity length of the Fabry-Perot cavity can be controlled within a reasonable range.

In addition, in this embodiment, a side of the first optical fiber 510 that is away from the first reflective film 311 is provided with a first demodulator. The first demodulator is configured to transmit an optical signal to the first optical fiber 510 and receive the optical signal reflected by the first reflective film 311 and the end surface of the first optical fiber 510 to obtain a cavity length variation of the Fabry-Perot cavity.

During usage, the first demodulator transmits an optical signal to the first optical fiber 510. The optical signal is received by the first demodulator after being reflected by the first reflective film 311 and the end surface of the first optical fiber 510. The cavity length variation of the Fabry-Perot cavity can be obtained according to the optical signal that is transmitted and received. To ensure the inclination measurement precision, an axis of the first optical fiber 510 is perpendicular to a plane on which the first reflective film 311 is located.

In addition, to alleviate the impact of the temperature on an inclination measurement result and improve the inclination measurement precision, the present application further provides a differential inclination measurement system 20 that includes an optical fiber inclination measurement apparatus 10 and a second measurement mechanism 200, with reference to FIG. 4 to FIG. 7.

Two cycloids 330 with a same length are provided.

The second measurement mechanism 200 includes a second optical fiber 210. The second optical fiber 210 is disposed opposite to the first optical fiber 510. The pendulum 310 is further provided with a second reflective film 313. The second reflective film 313 is disposed opposite to the first reflective film 311. The pendulum 310 is disposed between the first optical fiber 510 and the second optical fiber 210.

In this embodiment, an end surface of the first optical fiber 510 together with the first reflective film 311 form a Fabry-Perot cavity. An end surface of the second optical fiber 210 together with the second reflective film 313 also form a Fabry-Perot cavity. During usage, the respective cavity lengths of the two Fabry-Perot cavities alter in a manner that one becomes larger and the other becomes smaller. In this way, the impact of the temperature change on the inclination measurement result may be alleviated by the differential structure comprised of the two Fabry-Perot cavities.

To control an initial cavity length of the Fabry-Perot cavity to be within a reasonable range, an initial position of the second optical fiber 210 needs to be adjusted. Specifically, in this embodiment, the differential inclination measurement system 20 further includes a second fine adjustment mechanism 400. The second fine adjustment mechanism 400 includes a second holding member 430 and a second adjustment frame 410. The second adjustment frame 410 is disposed on the base 110. The second holding member 430 is fixed to the second adjustment frame 410. The second holding member 430 is configured to hold the second optical fiber 210. The initial position of the second optical fiber 210 can be adjusted by the second adjustment frame 410. Specifically, the second holding member 430 is provided with a mounting hole for allowing the second optical fiber 210 to pass through.

The second holding member 430 is provided with a dovetail groove. The second adjustment frame 410 is provided with a dovetail base that engages with the dovetail groove. The dovetail base engages with the dovetail groove to enable the second holding member 430 to be fixed to the second adjustment frame 410.

In this embodiment, the second holding member 410 is fixed to the second adjustment frame 430. The second adjustment frame 430 adjusts a position of the second holding member 430 so as to change the initial position of the second optical fiber 210, so that the initial cavity length of the Fabry-Perot cavity can be controlled within a reasonable range.

In addition, in this embodiment, a side of the second optical fiber 210 that is away from the second reflective film 313 is provided with a second demodulator. The second demodulator is configured to transmit an optical signal to the second optical fiber 210 and receive the optical signal reflected by the second reflective film 313 and the end surface of the second optical fiber 210 to obtain a cavity length variation of the Fabry-Perot cavity.

During usage, the second demodulator transmits an optical signal to the second optical fiber 210. The optical signal is received by the second demodulator after being reflected by the second reflective film 313 and the end surface of the second optical fiber 210. The cavity length variation of the Fabry-Perot cavity can be obtained according to the optical signal that is transmitted and received.

It should be noted that the first demodulator and the second demodulator may be the same one. Currently, the demodulator is usually multi-path and multi-channel, and thus can process two optical signals at the same time.

To ensure the inclination measurement precision, an axis of the second optical fiber 210 is perpendicular to a plane on which the second reflective film 313 is located.

In this embodiment, a distance from an end of the first optical fiber 510 that is adjacent to the first reflective film 311 to the first reflective film 311 is equal to a distance from an end of the second optical fiber 210 that is adjacent to the second reflective film 313 to the second reflective film 313. By using such a symmetrical design, the entire differential inclination measurement system 20 has a more coordinating structure.

In may be understood that in other embodiments, the distance from the end of the first optical fiber 510 that is adjacent to the first reflective film 311 to the first reflective film 311 may not be equal to the distance from the end of the second optical fiber 210 that is adjacent to the second reflective film 313 to the second reflective film 313. During usage, the two distances do not need to be identical, as long as the distance from the end of the first optical fiber 510 that is adjacent to the first reflective film 311 to the first reflective film 311 and the distance from the end of the second optical fiber 210 that is adjacent to the second reflective film 313 to the second reflective film 313 are greater than a swing distance of the pendulum 310. After the pendulum 310 inclines during a monitoring process by the optical fiber inclination measurement apparatus 10, one distance becomes larger and the other becomes smaller. In this way, a differential structure is likewise provided, thereby ensuring the measurement precision.

What stated above are merely preferred implementations of the present application, and are not intended to limit the present invention. For a person skilled in the art, the present application may have various modifications and variations. Any modification, equivalent replacement, improvement, and the like made within the spirit and the principle of the present application shall fall within the protection scope of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A differential inclination measurement system, wherein the system comprises:
   an optical fiber inclination measurement apparatus, wherein the apparatus comprises:
   a supporting mechanism comprising a base and a base frame fixed onto the base;
   a swinging mechanism comprising a pendulum and two cycloids with a same length, wherein each of the two cycloids has two ends connected to the base frame and the pendulum, respectively, a first reflective film is disposed on a first side surface of the pendulum and a second reflective film is disposed on a second side surface of the pendulum, and the second reflective film is disposed opposite to the first reflective film;

a first measurement mechanism comprising a first optical fiber, wherein an end surface of the first optical fiber is disposed opposite to the first reflective film; and a second measurement mechanism comprising a second optical fiber, wherein the second optical fiber is disposed opposite to the first optical fiber, and the pendulum is disposed between the first optical fiber and the second optical fiber.

2. The differential inclination measurement system according to claim 1, wherein the system further comprises a second fine adjustment mechanism comprising a second adjustment frame and a second holding member for holding the second optical fiber, wherein the second adjustment frame is disposed on the base, the second holding member is fixed to the second adjustment frame, and the second adjustment frame adjusts an initial position of the second optical fiber.

3. The differential inclination measurement system according to claim 2, wherein the second holding member is provided with a dovetail groove, the second adjustment frame is provided with a dovetail base, and the dovetail base is insertable into the dovetail groove to enable the second holding member to be fixed to the second adjustment frame.

4. The differential inclination measurement system according to claim 1, wherein a side of the second optical fiber that is away from the second reflective film is provided with a second demodulator, and the second demodulator is configured to transmit an optical signal and receive the optical signal reflected by the second reflective film and an end surface of the second optical fiber to obtain a cavity length variation of a Fabry-Perot cavity.

5. The differential inclination measurement system according to claim 1, wherein a distance from an end of the first optical fiber that is adjacent to the first reflective film to the first reflective film is equal to a distance from an end of the second optical fiber that is adjacent to the second reflective film to the second reflective film.

* * * * *